(12) United States Patent
Glover

(10) Patent No.: US 10,130,072 B2
(45) Date of Patent: Nov. 20, 2018

(54) GAME FEEDING SYSTEMS AND METHODS

(71) Applicant: Peter Glover, Negaunee, MI (US)

(72) Inventor: Peter Glover, Negaunee, MI (US)

(73) Assignee: BISTRO OUTDOORS LLC, Negaunee, MI (US)

( * ) Notice: Subject to any disclaimer, the term of this patent is extended or adjusted under 35 U.S.C. 154(b) by 195 days.

(21) Appl. No.: 15/346,703

(22) Filed: Nov. 8, 2016

(65) Prior Publication Data

US 2018/0125030 A1    May 10, 2018

(51) Int. Cl.
*A01K 39/014* (2006.01)
*A01K 5/02* (2006.01)
*B60P 7/12* (2006.01)
*B62D 63/06* (2006.01)

(52) U.S. Cl.
CPC .............. *A01K 5/0225* (2013.01); *B60P 7/12* (2013.01); *B62D 63/062* (2013.01)

(58) Field of Classification Search
CPC .......... A01K 5/0225; A01K 5/02; A01K 5/00; A01K 39/014
See application file for complete search history.

(56) References Cited

U.S. PATENT DOCUMENTS

| 4,986,220 A * | 1/1991 | Reneau | A01K 5/02 |
| | | | 119/57.91 |
| 7,222,583 B2 * | 5/2007 | Foster | A01K 5/0225 |
| | | | 119/57.91 |
| 2005/0241588 A1 * | 11/2005 | Foster | A01K 5/0225 |
| | | | 119/57.91 |

* cited by examiner

*Primary Examiner* — Kristen C Hayes
(74) *Attorney, Agent, or Firm* — Device Patent LLC

(57) ABSTRACT

Game feeding systems and methods are disclosed for feeding of large, medium, and small game such as bear, deer, and turkey. The system may be provided in a single configuration or configured for conversion between two or more configurations for use with various game. In one configuration, a feeder portion rests on the ground secured to an immovable object such as a tree. In another configuration, a feeder portion is elevated from ground by removable legs. In another configuration, a feeder portion is hung from a fixed overhead structure. A controller manages a spin plate for the distribution of game feed. Game may access feed through access holes in a feeder portion or from the ground after falling through a feeding grate in an extended configuration. A wheeled transport portion may be used for transporting a feeder portion to predetermined locations using tow capable vehicles such as an UTV.

20 Claims, 9 Drawing Sheets

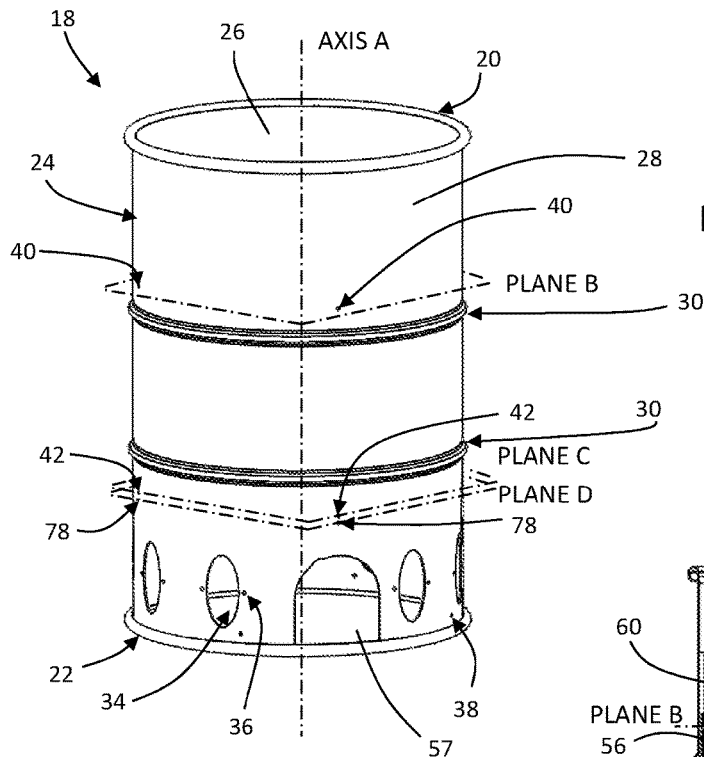

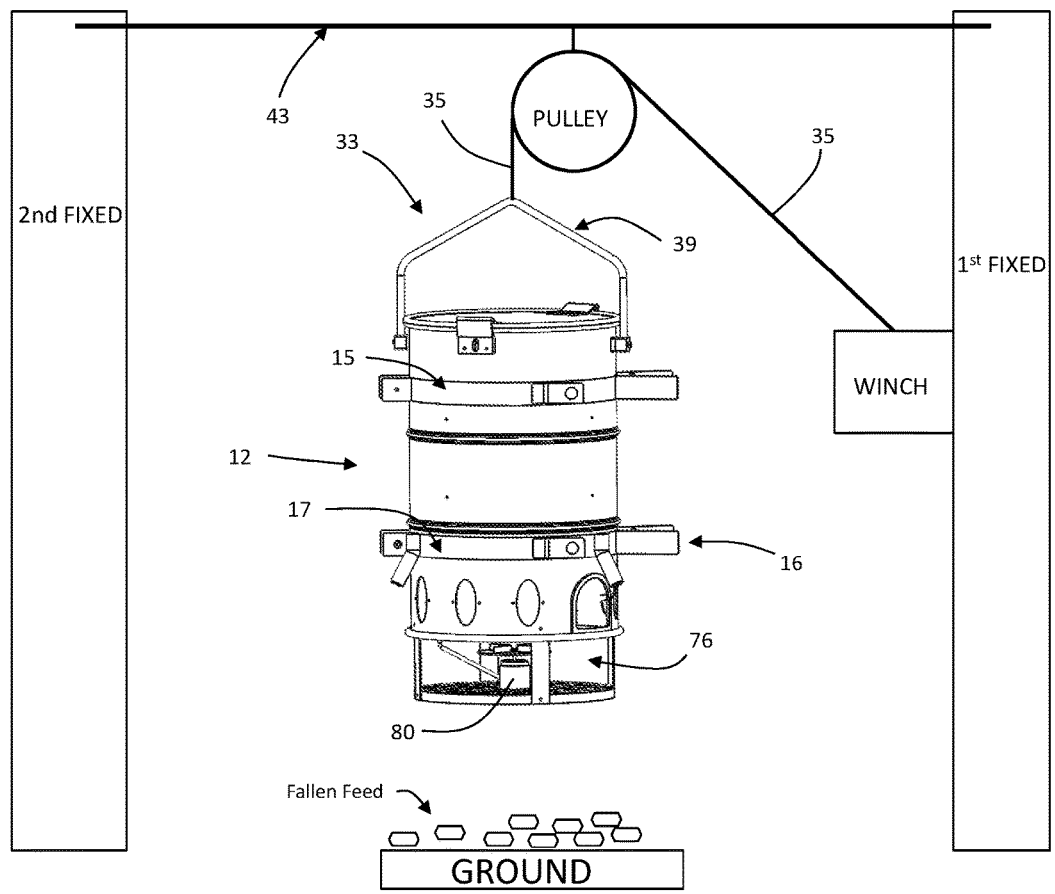
FIGURE 16
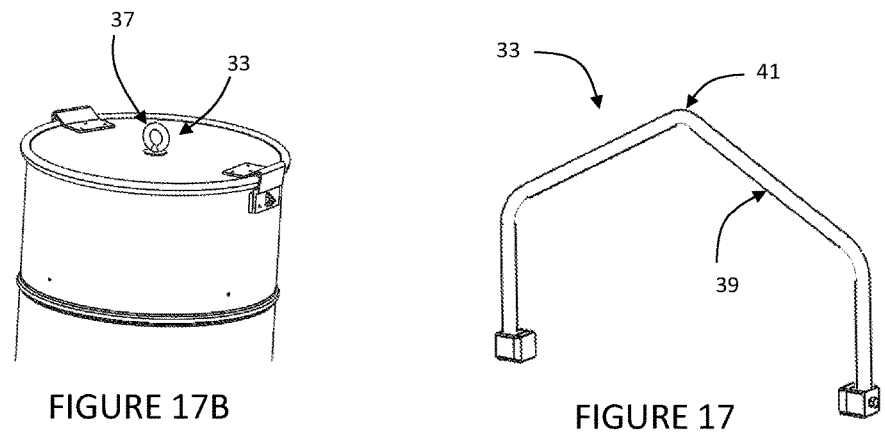
FIGURE 17B
FIGURE 17

GAME FEEDING SYSTEMS AND METHODS

This application is a U.S. non-provisional patent application.

BACKGROUND OF THE INVENTION

Field of the Invention

The invention relates generally to game feeding systems and methods of their use, and more particularly to convertible game feeding systems and their method of use that may be converted between configurations suited for various types of game. The invention also relates to an automated bear feeder configured for dispensing feed over an extended period of time and reinforced from destruction by bears or other animals.

Description of Related Art

The prior art describes game feeders utilizing a timed door which is opened according to a preprogrammed schedule. A user returns to the feeder on a daily basis to refill with game feed. Prior art devices allow access to a game feed stockpile which can lead to the spreading of diseases between game animals feeding from the same feed stockpile. The prior art lacks anchoring systems to secure the game feeder objects such as trees and lacks the ability to operate for extended periods of time before having to be refilled.

SUMMARY OF THE INVENTION

According to one form of this invention, a game feeding system comprises a feeder portion, a wheeled transport portion, and an anchor portion.

In one form, a feeder portion further comprises a barrel portion for storage and containment of feed.

In one form, said barrel portion comprises a superior rim and an inferior rim.

In one form, said superior and inferior rim is in the form of a rolled edge.

In one form, a feeder portion comprises one or more large game access holes placed near an inferior end of a barrel portion for access by large game such as the paw of a bear.

In one form, a feeder portion comprises one or more small game access holes placed near an inferior end of a barrel for access by small (or medium) sized game such as the beak of a turkey.

In one form, the one or more large games access holes is reinforced.

In one form, the reinforcement of the large game access hole is in the form of a plate surrounding the perimeter of the access hole.

In one form, one or more small game or large game access holes may be covered by a removable cover plate.

In one form, said removable cover plate is held to a barrel portion by fasteners such as screws, nuts, rivets, etc.

In one form, a feed funnel is adjustably secured at one or more pre-designated positions within said barrel portion along a longitudinal axis of the barrel.

In one form, a feed funnel is secured using fasteners such as screw or rivets, or by retainers, or by adhesives.

In one form, a feed funnel comprises a superior mouth portion diametrically sized to fit within the diameter of inner barrel walls.

In one form, a feed funnel comprises a smaller inferior mouth portion diametrically sized to limit the passage of game feed.

In one form, a feed support wall extends between the superior mouth portion and inferior mouth portion.

In one form, a feed support wall defines a feed space bounded by an upper face of the feed support wall and inner face of the barrel walls of the barrel for holding of game feed.

In one form, a feed support wall defines a distribution space bounded by a lower face of the feed support wall, a grate, and an inner face of the barrel walls for the distribution of feed.

In one form, said barrel portion comprises a hinged top cover covering access to the feed space and wherein a hinge extends between the top cover and an inner or outer face of the barrel.

In some forms the hinge is fastened, riveted, or welded to the top cover and inner or outer face of the barrel.

In some forms a removable top cover is held on a barrel portion by a bolted ring. Loosening of the bolt provides for removal of the bolted ring.

In some forms, a removable top cover of a barrel is rotated to open and closed positions wherein in an open position the top cover may be removed from a barrel portion and in a closed position the top cover is restrained to a barrel portion. Examples of this connection interface between a top cover and barrel is a bayonet style connection or a threaded connection.

In some forms, the top cover moves between a closed position preventing access to the feed space and an open position providing access to the feed space.

In one form, a feed space is enclosed within a barrel portion preventing access to the feed by game until distributed by a spinner plate thereby preventing diseases between game that can occur from game feeding from a common game feed pile.

In one form, the exterior of a game feeding system is manufactured to withstand the assault of large animals such as a bear without plastic deformation of the parts.

In one form, a barrel portion of a game feeding system, superior and inferior barrel covers, and internal grate portions are made of a durable material such as steel.

In some forms, the top cover is releasably locked by a cover lock.

In some forms, the cover lock comprises a cover end and barrel end configured to receive a padlock to prevent their separation in a closed and locked configuration.

In some forms a cover end of the cover lock is fastened, riveted, or welded to the top cover as is a barrel end to an inner or outer face of the barrel.

In one form, the top cover may be opened or removed for access to fill the barrel portion with game feed.

In one form, a grate portion is secured below the inferior feed mouth portion.

In one form, a grate portion is secured at or above an inferior rim of a barrel.

In one form, a grate portion is spaced and secured below an inferior rim of a barrel.

In one form, a grate portion is secured just above large and small game access holes at an inferior end of a barrel portion.

In one form, a plurality of extension straps are utilized between a barrel and a grate to secure a grate portion below a lower rim of a barrel in an extended configuration.

In one form, an extension space is defined inferior a barrel portion and superior a grate distanced from the barrel by extension straps.

In one form, fasteners, rivets, or welds are used to secure a grate portion to a barrel and to a grate.

In one form, a grate portion is diametrically sized to fit within the diameter of inner barrel walls of a barrel.

In one form, a grate portion comprises a plurality of feed apertures.

In one form, said feed apertures are sufficiently sized to allow free passage of game feed.

In one form, a motor housing is disposed on a grate portion.

In one form, a motor housing is in the form of a cup or a tube.

In one form, a motor housing is fastened, riveted, or welded to a grate.

In one form, a motor housing is open on a superior end.

In one form, said motor housing comprises an internal diameter sufficient to hold a spinner plate motor.

In one form, a spinner plate motor resides within a motor housing.

In one form, a central shaft of a spinner plate motor is orientated vertically when said motor is housed within a motor housing.

In one form, a central shaft of a spinner plate motor is generally aligned with a central axis of an inferior mouth portion of a barrel funnel and positioned inferior to an inferior mouth portion.

In one form, disposed on a superior portion of a central shaft of a spinner plate motor is a spinner plate wherein rotation of a spinner plate motor's central shaft causes consequent rotation of a spinner plate.

In one form, said spinner plate resides generally horizontal in an operative configuration with one or more vertically directed fins.

In one form a spinner plate is stopped or slowly rotating wherein the spinner plate is biased towards an inferior funnel mouth limiting the flow of game feed. With increased rotation speed, a spinner plate is biased away from an inferior funnel mouth causing increased flow and distribution of game feed.

In one form, a battery box is mounted to an inner face of a barrel wall.

In one form, said battery box is in the form of an outer shell defining an inner battery recess sufficient in size for housing of a battery.

In some forms, said battery box comprises a removable cover to protect a battery from outside elements such as rain or snow or game feed.

In one form, a control is mounted to or adjacent or within a battery box.

In one form, said control manages current flow between said battery and spinner plate motor.

In one form, a protective conduit extends between a battery box and a motor housing.

In one form, electrical wiring extends within a protective conduit between a controller, a battery, and a spinner plate motor.

In one form, said controller may be programmed to adjust spinner plate motor speed and on/off cycles.

In some forms, said barrel portion comprises a bottom barrel cover.

In some forms, said bottom barrel cover is fixed to the barrel walls.

In some forms, a bottom barrel cover is releasably attached to an inferior rim of a barrel.

In some forms, a releasable compression strap is used to secure a bottom barrel cover to an inferior rim of a barrel.

In some forms, a bottom barrel cover comprises a central mouth aperture for the passage of game feed when feeder portion is in an extended configuration.

In one form, the feeder system is arranged in a ground supported standard configuration wherein said grate is mounted within the barrel portion superior a large game access hole and a bottom barrel cover is secured to an inferior rim of the barrel. A feed funnel is mounted in a superior position within a barrel portion and a spinner plate and motor is mounted therebetween the feed funnel and grate portion. A large game access hole is exposed.

In one form, the feeder system is set in a ground supported standard configuration and one or more cover plates are removed to expose one or more small game access holes.

In one form, an inferior barrel cover and a grate and inside surface of barrel walls define a drop space.

In one form, an upper barrel ring, a lower barrel ring, or both an upper barrel ring and a lower barrel ring encircle a barrel and provide features for securing the barrel portion to a stationary object such as a tree.

In one form, a upper barrel ring, a lower barrel ring, or both an upper barrel ring and a lower barrel ring encircle a barrel and provide features for securing the barrel portion to a transport device such as a barrel trailer.

In one form, two or more barrel rings encircle a barrel and provide features for securing the barrel portion to a transport device or stationary object such as a tree.

In some forms, an upper or lower barrel ring comprises a ring bolt with cooperating nut extending through ends of a barrel ring for tightening the barrel ring about an outer barrel surface.

In some forms, an upper or lower barrel ring comprises one or more restraint flanges extending from the ring for securing an end of a tensioning strap.

In one form, an upper or lower barrel ring comprises one or more restraint flanges extending from the ring wherein the restraint flange comprises a flange aperture for coupling with a tensioning strap.

In one form, an upper or lower barrel ring comprises one or more anchor arms extending from the ring for securing against an immovable object such as a tree trunk or post.

In one form, an upper or lower barrel ring comprises a pair of spaced anchor arms for holding a tree trunk, post, or other immovable object therebetween.

In one form, spaced anchor arms extend directly from an outer surface of a barrel portion.

In one form, restraint flanges extend directly form an outer surface of a barrel.

In one form, a hanger portion is secured to and extends from a portion of a barrel or barrel cover for attachment of a tension line to hang a game feeding system from a tree branch, pulley, or other fixed overhead object.

In one form, a hanger portion is in the form of an eye bolt or handle extending from a superior cover of the barrel portion.

In one form, a hanger portion is in the form of a pivotable handle secured to an outer surface portion of a barrel. The pivotable handle may include a raised attachment portion for coupling with a hanging tension line.

In one form, a support line such as a cable is extended between to two spaced fixed objects such as trees and secured to each at one end of the cable. A pulley is attached to a site on the support line. One end of a hanging tension line is secured to a hanger on the feeder system and the other end is secured to a tree trunk or a winch fixed to the tree trunk to cause the feeder portion to securely hang in an elevated position off the ground out of reach of large game such as bears. The winch may be used to raise and lower the game feeder portion.

In one form, a game feeding system comprises a barrel trailer for transporting the feeder to a predetermined location.

In one form, a barrel trailer comprises an axle extending between opposing wheels and a transport beam secured generally perpendicular to the axle.

In one form, a barrel trailer comprises a hitch interface extending from a transport beam for connecting to a transport vehicle such as an UTV.

In one form, a central axis of a feeder portion is secured generally parallel to a barrel trailer's transport beam during transport of a feeder portion.

In one form, the central axis of a feeder portion is generally horizontal during transport in a transport configuration and the central axis of the feeder portion is generally vertical in an operational configuration.

In one form, a barrel trailer remains secured to a feeder portion in both a transport configuration and an operational configuration.

In one form, a game feeder system may be converted from between two or more configurations including; a ground supported standard configuration for large game such as bear wherein the device is ground supported and small game access holes (if present) are covered, to a ground supported standard configuration for small game such as turkey wherein the small game access holes are uncovered, to a standing standard configuration for small game such as turkey wherein the feeder portion is elevated on legs and small game access holes are uncovered, to an standing extended configuration for small-medium game such as turkey and deer wherein the feeder portion is supported by a plurality of removable legs and the barrel is in an extended configuration, and a bear-safe hanging configuration for all game wherein a feeder portion is supported above a ground surface by a tension line extending from a fixed overhead structure such as a tree branch and secured to a hanger portion and the barrel is in an extended configuration for distribution of feed to ground below.

Further, in one form of ground supported standard configuration, a feeder portion with attached inferior cover rests on the ground and game feed drops down through an inferior mouth portion of a feed funnel to a spinner plate. The game feed is spun off the spinner plate, through a grate, to the top face of a bottom barrel cover. Large game such as a bear, are able to collect the feed by extending their paw through a large game access hole and pulling the feed out. If so equipped, the small game access holes are covered by cover plates. In one form the feeder portion is secured to an immovable object such as a tree by an anchor portion.

In one form of a ground supported standard configuration for small game such as turkeys, a feeder portion with attached inferior cover rests on the ground and game feed drops down through an inferior mouth portion of a feed funnel to a spinner plate. The game feed is spun off the spinner plate, through a grate, to the top face of a bottom barrel cover. Small game access holes are uncovered. Small game, such as turkeys, extend their heads through the small game access holes to gather and consume the feed. In an alternative standing standard configuration, the game feeder portion is elevated by removable legs.

In one form of an extended standing configuration for feeding game, a barrel is in an extended configuration wherein a grate with spinner plate is secured by extension straps below an inferior rim of a barrel creating an extension space. Game feed drops down through an inferior mouth portion of a feed funnel to a spinner plate. Some of the game feed is spun radially off the spinner plate through the extension space to spread across the ground in a diameter larger than the barrel portion. Other game feed falls through the extension space and through feed apertures in the grate to the ground. Once on the ground the game feed is consumed by game such as bear, deer, and turkey.

In one form of a bear-safe hanging configuration for all game, the feeder portion is hung by a tension line extending from a fixed overhead structure such as a tree branch or a support line extending between two spaced trees. The tension line may interface with a pulley and a winch to ease raising and lowering the feeder portion. Game feed drops down through an inferior mouth portion of a feed funnel to a spinner plate. The game feed is spun off the spinner plate and spread radially through an extension space or falling through an extension space then through the grate to the ground where a game such as a bear, deer, or turkey can consume it.

In some forms the radial sides of an extension space above a grate include a radial wall to prevent game from; accessing game feed through a mouth portion, damaging a spinner plate, or damaging a spinner plate motor or associated electrical wiring. In some forms the radial wall portion is perforated to allow feed to fly off a spinner plate and through the perforations thus providing an enlarged radial spread of feed on the ground.

In one form, a superior barrel cover is opened exposing a feed space. The feed space is filled partially or entirely with game feed and the superior barrel cover is re-secured in a closed position. A control is programmed to intermittently activate a spinner plate motor coupled to a spinner plate located inferior to an inferior mouth portion of a feed funnel. Game feed dropping from the inferior mouth is then spun off the spinner plate to a location assessable to game such as bears. The preprogrammed intermittent distribution controlled by the controller provides an effective method for distributing game feed in smaller portions over the course of days, weeks, and months before the feed space is empty of game feed and requires refilling. The intermittent portions are sufficient to keep game returning periodically to consume the available feed.

DESCRIPTION OF THE SEVERAL VIEWS OF THE DRAWINGS

These and other features and advantages of the present invention will become more readily appreciated when considered in connection with the following detailed description and appended drawings, wherein:

FIG. 3 is a top perspective view of one embodiment of a barrel portion with covers, hinges, locks, and other plates removed;

FIG. 4 is a mid-plane cross sectional view of the game feeding system of FIG. 1 illustrating internal components;

FIG. 4A is a perspective mid-plane cross-sectional view of the feeder portion of the game feeding system of FIG. 1;

FIG. 16 is a schematic-perspective illustration of one embodiment of a feeder portion in an extended configuration hanging from an overhead support line;

FIG. 17 is a perspective view of one embodiment of a hanger portion in the form of a pivotable handle;

FIG. 17B is a partial perspective view of one embodiment of a feeder portion having a hanger portion in the form of an eyebolt.

DETAILED DESCRIPTION OF SELECT EMBODIMENTS

Figure 1:
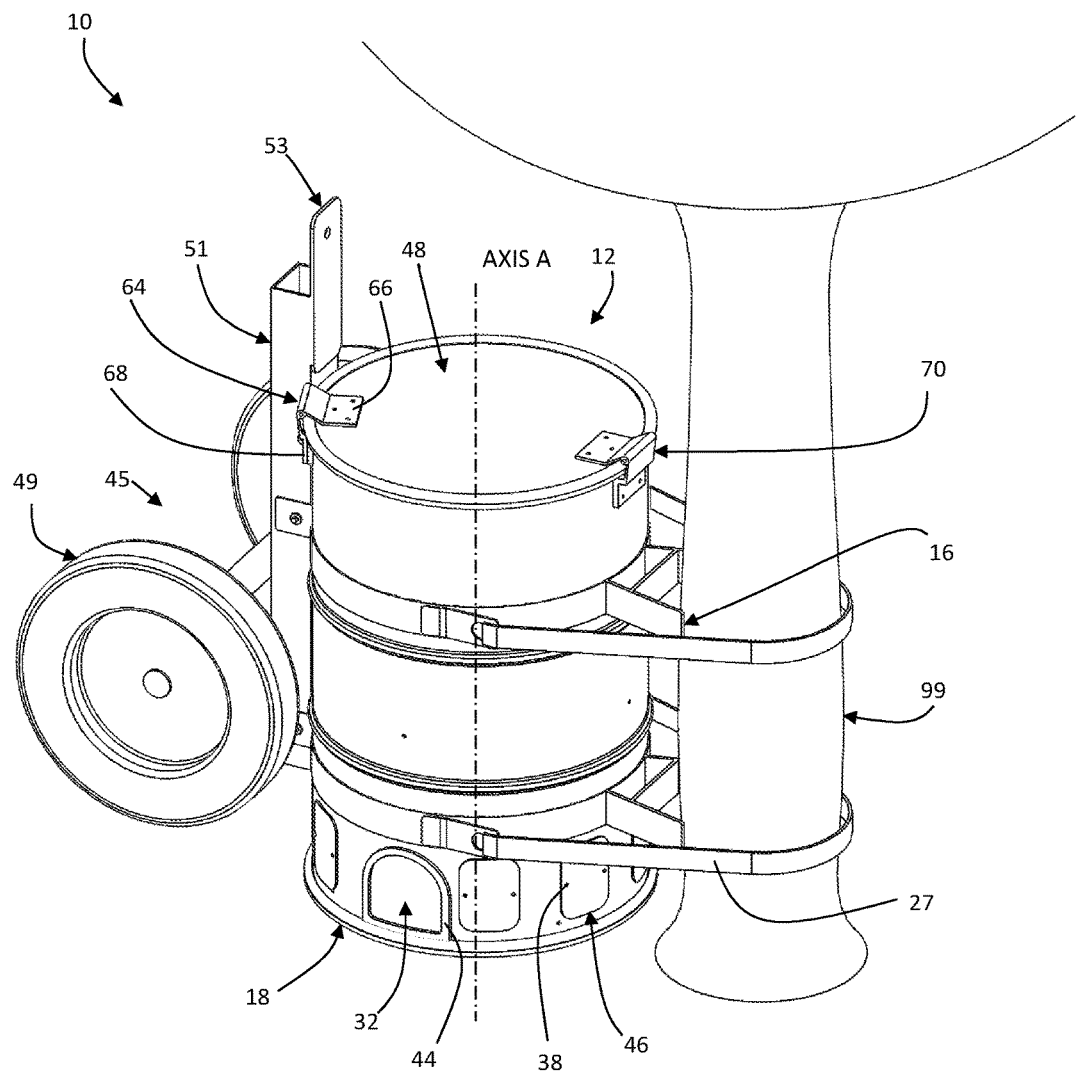
FIG. 1 is a top perspective view of one embodiment of a game feeding system including a wheeled transport. The game feeding system is illustrated sitting on ground and secured to the trunk of a tree.

Referring to the figures, wherein like numerals indicate like or corresponding parts throughout the several views, FIG. 1 illustrates one form of the invention in a ground supported standard configuration for large game which includes a game feeding system 10 comprising a feeder portion 12 for storage and controlled release of game feed, a wheeled transport portion for eased transport of the feeding system in the form of a barrel trailer 45, and an anchor portion 16 for securing a feeder portion 12 to an immovable object such as a tree. A feeder portion 12 further comprises a barrel portion 18 for storage and containment of feed and protection against unintended access to game feed and electronics by wild animals or other humans.

A barrel portion 18 (FIG. 3—with superior and inferior cover removed) comprises an elongate barrel wall 24 that is generally cylindrical in preferred embodiments but may assume other shapes. In preferred embodiments a barrel portion 18 is in the form of a standard 55-gallon steel drum although in some forms the drum may be of other materials such as polymers. An inner face 26 defines the inside surface of the barrel whereas an outer face 28 defines the outside surface of the barrel. Barrel wall 24 may be reinforced by one or more expansion rings 30 here in the form of circumferential bulges to stiffen the side of the barrel. A superior rim 20 is located at a superior end of the barrel and an inferior rim 22 located at an inferior end of the barrel. The superior and inferior rim are preferably enlarged and may be in the form of a rolled edge for further stiffening of a barrel wall 24 and for complementary fit with a superior or inferior barrel cover 48, 50. A feeder portion 12 comprises one or more large game access holes 32 placed near an inferior end of a barrel portion 18 for access by large game such as the paw of a bear. The one or more large game access holes 32 may be reinforced with for example an access hole plate 44 surrounding the perimeter of the large game access hole 32.

In some embodiments, a feeder portion 12 also comprises one or more small game access holes placed near an inferior end of a barrel for access by small (or medium) sized game such as the beak of a turkey. In preferred embodiments, the small game access holes 34 (FIG. 3-4) are vertically elongated along Axis-A and may be generally elliptical in shape however they may assume a variety of shapes. One or more first cover plate lock holes 36 (which may be threaded) may be present for securement of a cover plate 46 over the small game access holes 34. One or more small game access holes may be covered by one or more cover plates 46. Cover plate 46 may comprise one or more second cover plate lock holes 38 configured for alignment with first cover plate lock holes 36 when cover plate 46 is positioned to cover a small game access hole 34. Fasteners may be extended through lock holes 36 and 38 to removably secure cover plate 46 to outer face 28. Cover plate 46 is sufficiently sized to cover hole 34 and may be contoured to complement the shape of outer face 28.

Figure 9:
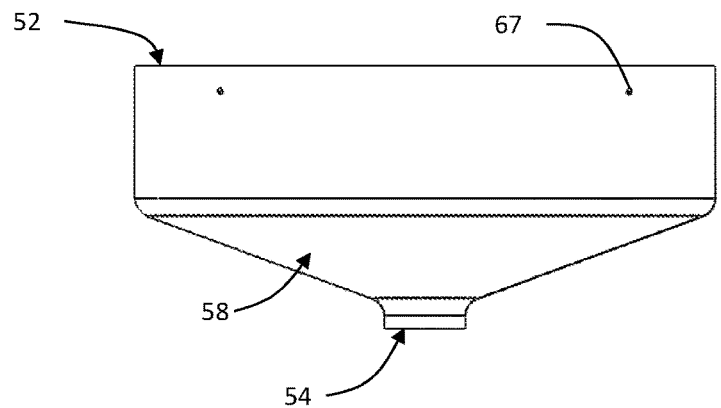
FIG. 9 is a side view of one embodiment of a feed funnel having a central axis C.
Figure 10:
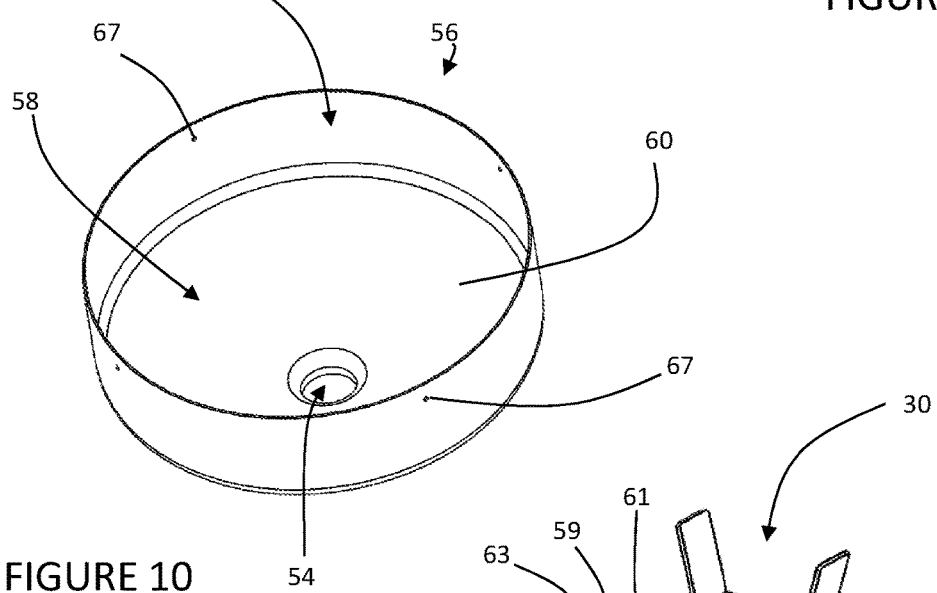
FIG. 10 is a top perspective view of one embodiment of a feed funnel.
Figure 11:
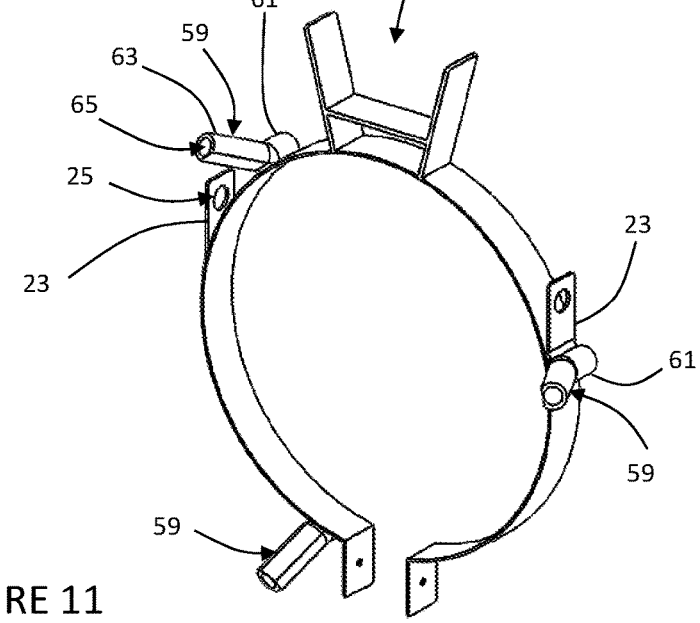
FIG. 11 is an inferior perspective view of one embodiment of barrel ring.

In one form, a feed funnel 56 is secured at pre-designated positions along axis-A within a barrel portion 18 using fasteners such as screw or rivets, or by retainers, or by adhesives. In a preferred embodiment, feed funnel 56 (FIG. 9-10) comprises a superior mouth 52 portion diametrically sized to fit within the diameter of inner face 26 of barrel wall 24. Feed funnel 56 comprises a smaller inferior mouth 54 portion diametrically sized to limit the passage of game feed. A feed support wall 58 slopes downwards and extends between superior mouth 52 portion and inferior mouth 54 portion. A feed space 60 within feed portion 12 is defined and bounded by an upper face of the feed support wall 58 and inner face 26 of the barrel walls 24 of the barrel portion 18 and superior barrel cover 48 for holding of game feed. A distribution space 62 is defined by grate portion 72 and a lower face of the feed support wall 58 and inner face 26 of the barrel walls 24 for the distribution of feed.

Figure 15:
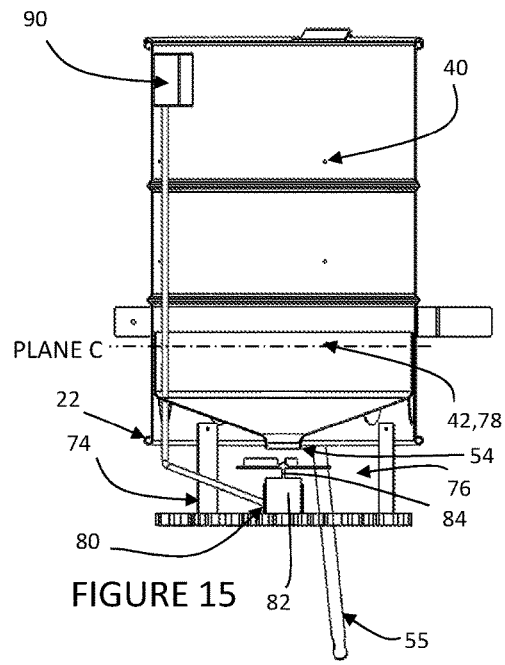
FIG. 15 is a mid-plane cross-sectional view of the feed portion of FIG. 12.
Figure 18:
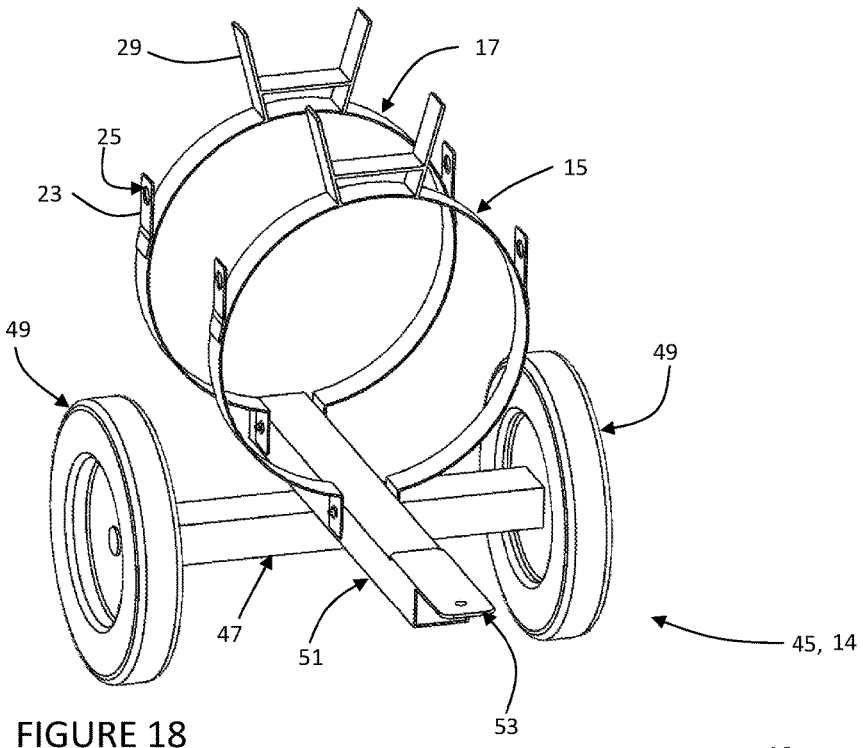
FIG. 18 is a front perspective view of one embodiment of a barrel trailer.

In a standard configuration, feed funnel 56 is secured generally at Plane B along axis-A as illustrated in FIGS. 3 and 4A. In an extended configuration, feed funnel is mounted generally at Plane C as illustrated in FIG. 3 and FIG. 15 wherein inferior mouth portion 54 assumes an inferior position near a plane defined by inferior rim 22. In other words, feed funnel 56 may be adjusted along axis-A and secured at various positions by aligning second funnel holes 67 in superior mouth portion 52 with complementing funnel holes extending through barrel wall 24. For example, feed funnel 56 maintains an elevated position (standard configuration) when first funnel hole 40 of feed funnel 56 is aligned with second funnel hole 67 of feed funnel 56. Whereas feed funnel 56 maintains a lower position (for extended configuration) when first funnel hole 40 of feed funnel 56 is aligned with $3^{rd}$ funnel hole 42.

In a standard configuration (FIG. 4A), grate portion 72 is secured along axis-A generally at plane D located just superior to the small and large game access holes 34, 32. For example, first grate holes 78 in barrel wall 24 are aligned with complementing second grate holes 81 extending through radial sides (not shown) in grate portion 72 to secure it in this position. In some configurations, planes C and D may overlap wherein third funnel hole 42 and first grate hole 78 are coincident and may be used to secure either the grate portion 72 or feed funnel 56.

In a standard configuration, a distribution space 62 is defined superiorly by feed support wall 58 and radially by inner face 26 of barrel wall 24 and inferiorly by grate portion 72. Within distribution space 62 game feed drops through inferior mouth 54 portion to spinner plate 86 before being flung off and falling through grate 72 to inferior barrel cover 50 where it can be accessed by game.

In one form, superior barrel cover 48 is secured by a band clamp (not shown) and may be removed by removal or loosening of the band clamp. In preferred forms, said barrel portion 18 comprises a hinged superior cover 48 restricting access to feed space 60 and wherein a cover hinge 70 extends between superior cover 48 and an inner or outer face 26, 28 of barrel portion 18. In some forms cover hinge 70 is fastened, riveted, or welded to superior cover 48 and inner or outer face 26, 28 of the barrel portion 18. Superior cover 48 moves between a closed configuration preventing access to the feed space and an open configuration providing access to the feed space for filing with game feed, cleaning, observation, and for access to control and power systems by a user. The top cover may be releasably locked by a cover lock 64. Cover lock 64 comprises a cover end 66 and barrel end 68 and may be configured to receive a padlock to prevent their separation 66/68 to maintain a closed and locked configuration. Cover end 66 of cover lock 64 is fastened, riveted, or welded to superior barrel cover 48 as is a barrel end 68 to an inner or outer face 26, 28 of barrel 18.

In one form of a standard configuration, a grate portion 72 is spaced and secured below inferior mouth portion 54 at or above an inferior rim of a barrel 18 preferably at Plane D located superior to small game 34 and large game access holes 32. A plurality of first grate holes 78 near Plane D through barrel wall 24 correspond with $2^{nd}$ grate holes (not shown) extending through the sides of grate portion 72 to releasably secure grate portion 72 at Plane D. A drop space 69 here is bounded by the grate portion 72, inner face 26 of barrel wall 24, and feed support wall 58 of feed funnel 56. In one form of an extended configuration (FIG. 12), grate portion 72 is spaced and secured below an inferior rim 22 of a barrel 18 at Plane E. In this embodiment, a plurality of extension straps 74 are utilized between a barrel portion 18 and a grate 72 to secure grate portion 72 below an inferior rim 22 of a barrel 18. Extension straps 74 may be secured over inner face 26 or outer face 28 which provides for inferior barrel cover 50 to be left secured to inferior rim 22. In this extended configuration, an extension space 76 is defined below a barrel 18 and above the grate distanced from the barrel by extension straps 74. Fasteners, rivets, or welds may be used to secure grate portion 72 to a barrel 18 or to extension strap 74. In one form, grate portion 72 is diametrically sized to fit within the diameter of inner face 26 of barrel 18.

Grate portion 72 comprises a plurality of feed apertures 79 wherein said feed apertures 79 are sufficiently sized to allow free passage of game feed housed and released from feed space 60.

In preferred embodiments, a motor housing 80 is disposed on grate portion 72. Motor housing 80 may be in the form of a cup or a tube fastened, riveted, or welded to grate 72. Motor housing 80 in this embodiment is open on a superior end comprising an internal diameter and inner cylindrical defined space sufficient to house a spinner plate motor 82 therein. A central shaft 84 of a spinner plate motor 82 is orientated vertically when motor 82 is housed within a motor housing 80. In this embodiment, a central shaft 84 of spinner plate motor 82 is generally aligned with and inferior to central axis (Axis-A) and inferior mouth portion 54.

Coupled to a superior portion of a central shaft 84 of a spinner plate motor 82 is a spinner plate 86 wherein rotation of a spinner plate motor's central shaft causes consequent rotation of spinner plate 86. In this embodiment, spinner plate 86 resides generally horizontal and comprises one or more superiorly directed fins 88.

In this embodiment, a battery box 90 is mounted to an inner face 26 of barrel wall 24. Battery box 90 is in the form of an outer shell 92 defining an inner battery recess (inside) sufficient in size for housing of a battery 94 (not shown). In preferred embodiments, a 6V or 12 volt battery may be used however in most cases battery 94 is configured to match other components in the system such as spinner plate motor 82 and controller 96. Battery box 90 preferably comprises a removable cover (not shown) to protect battery 94 from outside elements such as rain or snow.

A controller 96 is preferably mounted to or adjacent battery box 90. Control 96 manages current flow between battery 94 and spinner plate motor 82. Protective conduit 98 may extend between battery box 90 and a motor housing 80. Electrical wiring 11 extends within protective conduit 98 between control 96, battery 94, and spinner plate motor 82. Control 96 may be programmed to adjust spinner plate motor speed and on/off cycles. In some forms, barrel portion 18 comprises an inferior barrel cover 50 which may be fixed to inferior rim 22 of barrel walls 24 or typically releasably attached to an inferior rim 22 of barrel portion 18 using a component such as a releasable compression strap (not shown). Inferior barrel cover 50 comprises a mouth aperture 13 for the passage of game feed when feeder portion 12 is used in an extended configuration. The inferior barrel cover is optional but preferred in this configuration to protect feed funnel 56 from attack by animals.

In some forms, an upper barrel ring 15, a lower barrel ring 17, or both an upper barrel ring and a lower barrel ring encircles a barrel 18 and provides features for securing the barrel portion to a stationary object such as a tree 99.

In preferred embodiments, an upper barrel ring 15, a lower barrel ring 17, or both an upper barrel ring 15 and a lower barrel ring 17 encircle barrel portion 18 and provide features for securing the barrel portion to a transport device such as a barrel trailer 45. In some forms, upper or lower barrel ring 15, 17 comprise a ring bolt 21 with cooperating nut extending through ends of a barrel ring 15, 17 for tightening the barrel ring about outer barrel face 28.

Upper or lower barrel ring 15, 17 may comprise one or more restraint flanges 23 extending from ring 15, 17 for securing an end of a tensioning strap. Restraint flange 23 may comprises a flange aperture 25 for coupling with a fixation strap 27. Fixation strap 27 is preferably in the form of a ratchet strap having hooks on each end for hooking through flange aperture 25 for the function of tightening barrel ring 15, 17 and anchor portion tightly against an immovable object such as a tree 99. In another form, a segment of chain or cable may be used between a restraint flange and terminal end of a fixation strap preventing game from chewing through a non-metallic fixation strap.

Upper or lower barrel ring 15, 17 may also comprise one or more anchor arms 29 extending from ring 15, 17 for securing against an immovable object such as a tree trunk or post to prevent natural elements or animals from moving feeding system 10. In preferred forms anchor arm 29 is in the form of flat bar or post. In some forms, upper or lower barrel ring, or upper and lower barrel ring 15, 17 comprise a pair of divergent spaced anchor arms 31 for holding a tree trunk, post, or other immovable object therebetween. In alternative embodiments, the spaced anchor arms 31 extend directly from an outer face 28 of barrel 18. Similarly, in alternative embodiments, restraint flanges extend directly form an outer surface of a barrel.

A hanger portion 33 in this embodiment is secured to and extends from a portion of a barrel 18 or superior barrel cover 48 for attachment of a tension line 35 to hang a feeder portion 12 from a tree branch or other fixed overhead object. In one form, a hanger portion 33 is in the form of an eye bolt 37 or handle extending from a superior cover 48 of barrel portion 18 as illustrated in FIG. 17B.

In one form, hanger portion 33 is in the form of a pivotable handle 39 secured to an outer face 28 portion of barrel 18. Pivotable handle 39 may include a raised attachment portion 41 for coupling with hanging tension line 35 and to keep the tension line generally aligned with axis A such that axis A maintains a vertical orientation when hanging.

A support line 43 (FIG. 16) such as a cable is extended between to two elevated fixed objects such as spaced trees and secured to each tree at one end of the cable. A pulley is attached to a site on support line 43. One end of a hanging tension line 35 is secured to a hanger portion 33 on feeder portion 12 and the other end is secured to a tree trunk or a winch fixed to the tree trunk to cause feeder portion 12 to securely hang in an elevated position off the ground out of reach of large game such as bears. The winch may be used to raise and lower the game feeder portion to add game feed to feed space 60, adjust the controller, service the battery or other components, or release or attach feeder portion 12 from tension line 35.

Figure 2:
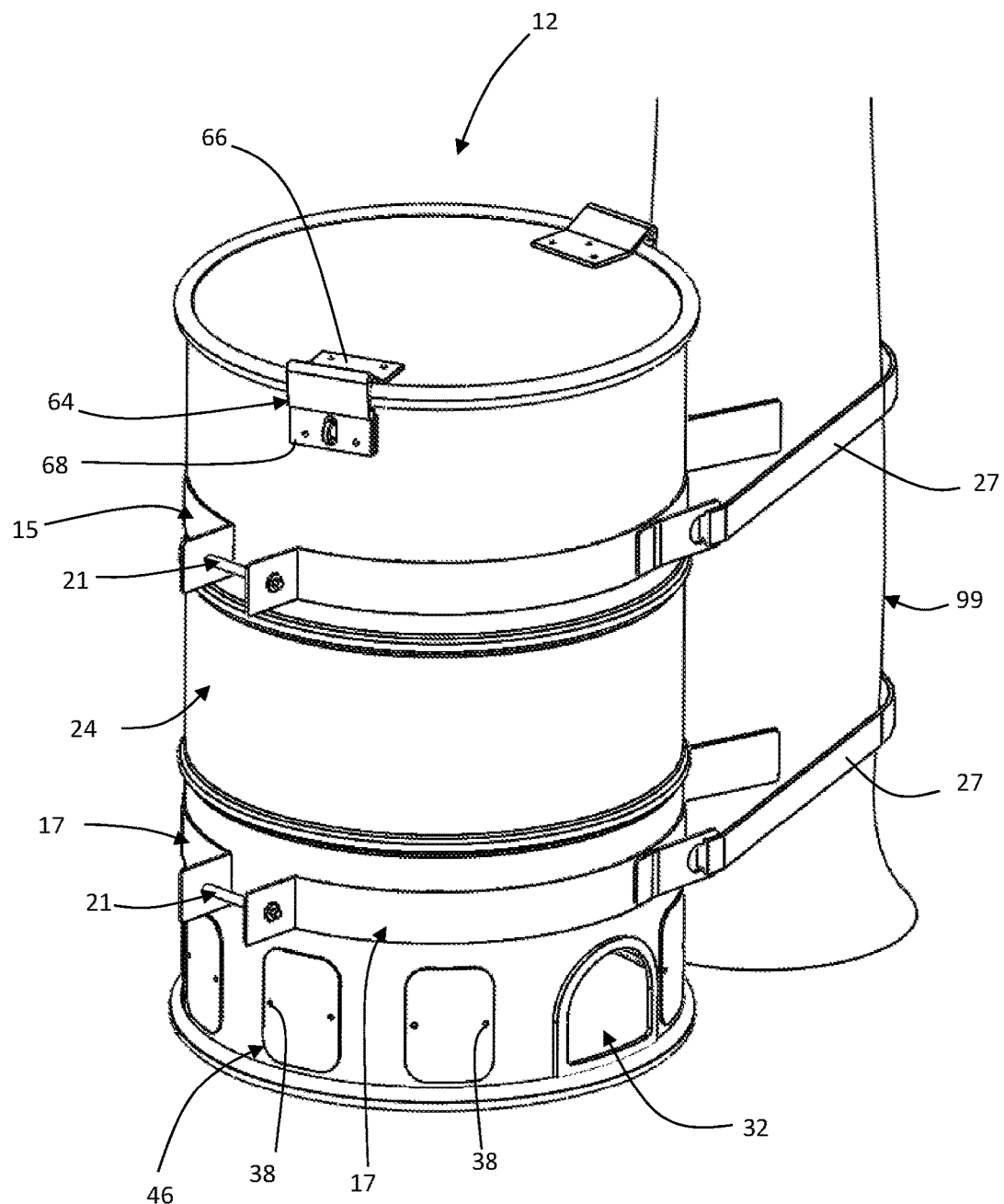
FIG. 2 is a top perspective view of the game feeding system of FIG. 1 resting on a ground surface with wheeled transport removed.
Figure 5:
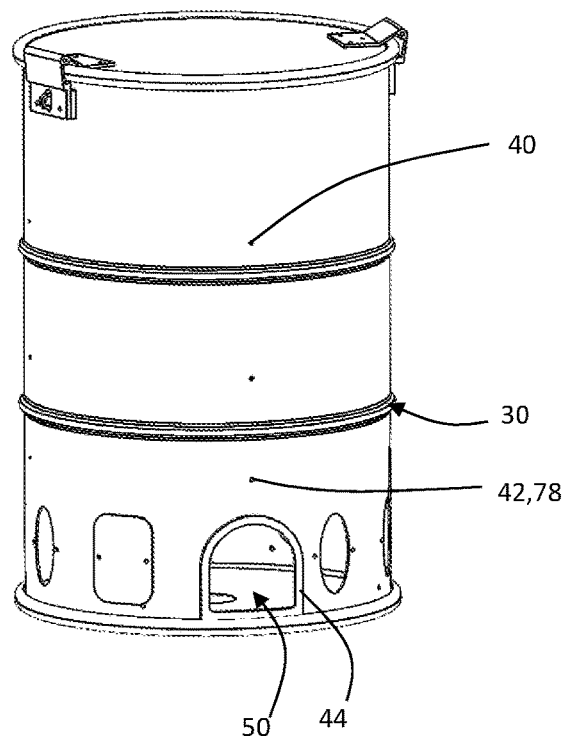
FIG. 5 is a front perspective view of the feeder portion of the game feeding system of FIG. 1. Some small game access holes are illustrated as covered whereas others are uncovered.
Figure 19:
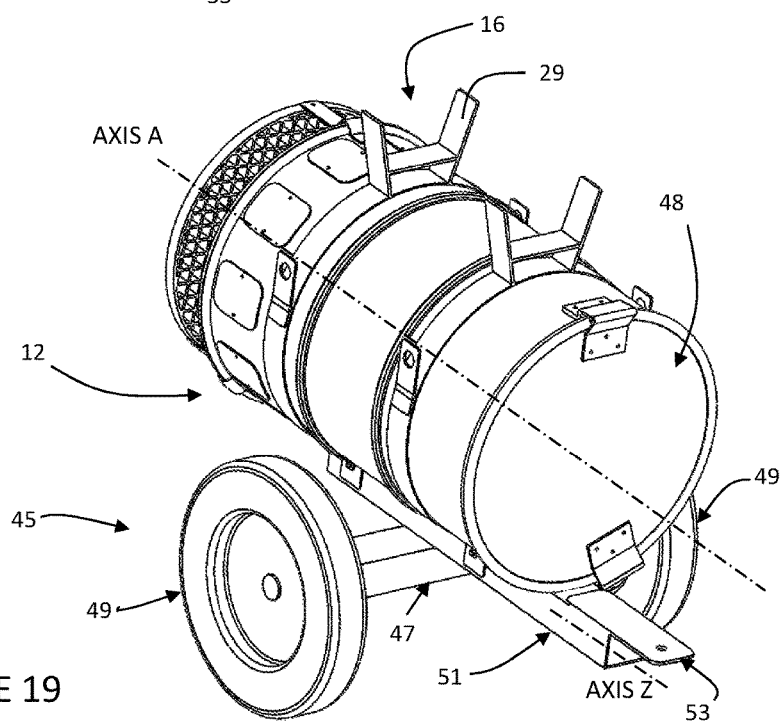
FIG. 19 is a front perspective view of the barrel trailer of FIG. 18 with feeder portion in an extended configuration attached.

In one form, game feeding system 10 comprises a barrel trailer 45 for transporting feed portion 12 to a predetermined location. In one embodiment, barrel trailer 45 comprises an axle 47 extending between opposing wheels 49 and a transport beam 51 secured generally perpendicular to axle 47. Barrel trailer 45 comprises a hitch interface 53 for connecting to a transport vehicle such as an UTV that can deliver feeder portion 12 along a trail or other terrain. In this embodiment, central axis-A of feeder portion 12 is secured generally parallel to the elongate axis-Z of barrel trailer's transport beam 51. During transport central axis-A of feeder portion 12 is generally horizontal in a transport configuration and generally vertical in an operational configuration (FIG. 2). Barrel trailer 45 may remain secured to feeder portion 12 in both a transport configuration (FIG. 19) and an operational configuration (FIG. 1).

Game feeder system 10 may be configured for dedicated use for one type of game or may be converted from between two or more configurations including; a ground supported standard configuration for large game wherein the feeder portion 12 is ground supported and small game access holes 34 (if present) are covered with cover plate 46, to a ground supported standard configuration for small game such as turkey wherein the feeder portion 12 is ground supported and the small game access holes 34 are uncovered, to a standing standard configuration for small game such as turkey wherein the feeder portion 12 is elevated by a plurality of removable legs 55 and feeder portion 12 is in an extended configuration, and a bear-safe hanging configuration for all sized game wherein a feeder portion 12 is supported above a ground surface by a tension line 35 extending from a fixed overhead structure such as a tree branch or support line 43 and secured to a hanger portion 33 and feeder portion 12 is in an extended configuration.

In one form of a ground supported standard configuration for large game such as bear (FIG. 2, 4A), a feeder portion 12 with attached inferior barrel cover 50 rests on the ground and game feed stored in feed space 60 drops down through inferior mouth portion 54 of feed funnel 56 to spinner plate 86. The game feed is spun off the spinner plate 86, through a grate 72, to rest on the top face 57 of inferior barrel cover 50. Large game such as a bear, are able to collect the feed by extending their paw through a large game access hole 32 and pulling the feed out. If so equipped, the small game access holes 34 are covered in this configuration by cover plates 46. In one form feeder portion 12 is secured to an immovable object such as a tree 99 by an anchor portion 16.

Figure 6:
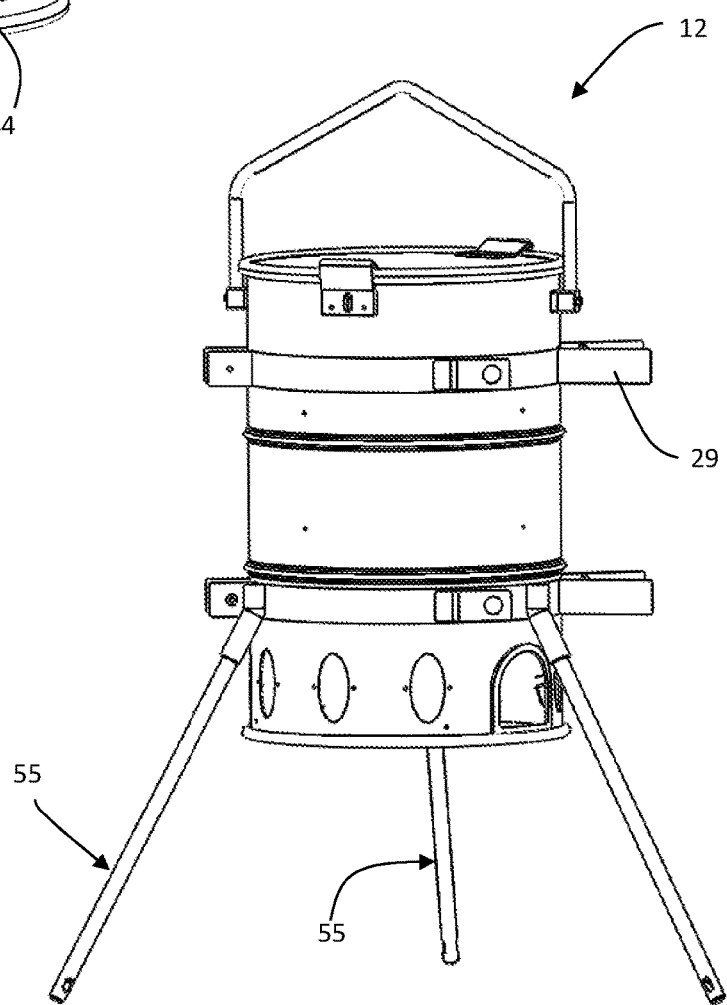
FIG. 6 is a perspective view of one embodiment of a game feeding system wherein a feeder portion is elevated from ground by legs and small game access holes are uncovered.
Figure 7:
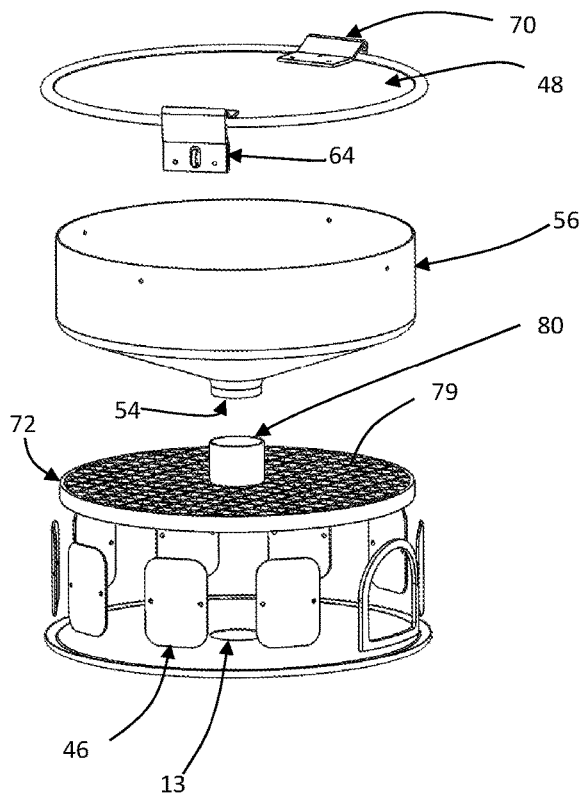
FIG. 7 is a perspective view of the feeder portion of the game feeding system of FIG. 1 with barrel portion and feed distribution system removed.
Figure 8A:
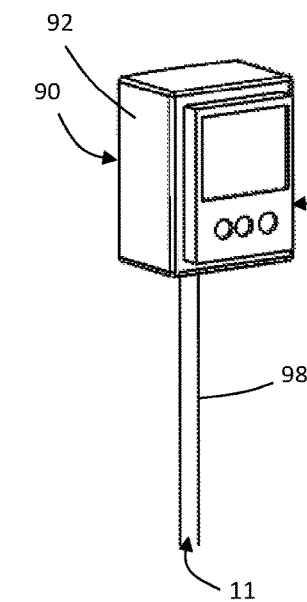
FIG. 8A is a perspective view of one embodiment of an outer shell of a battery box, a portion of protective conduit extending toward a spinner motor, and a control secured to the battery box.
Figure 8:
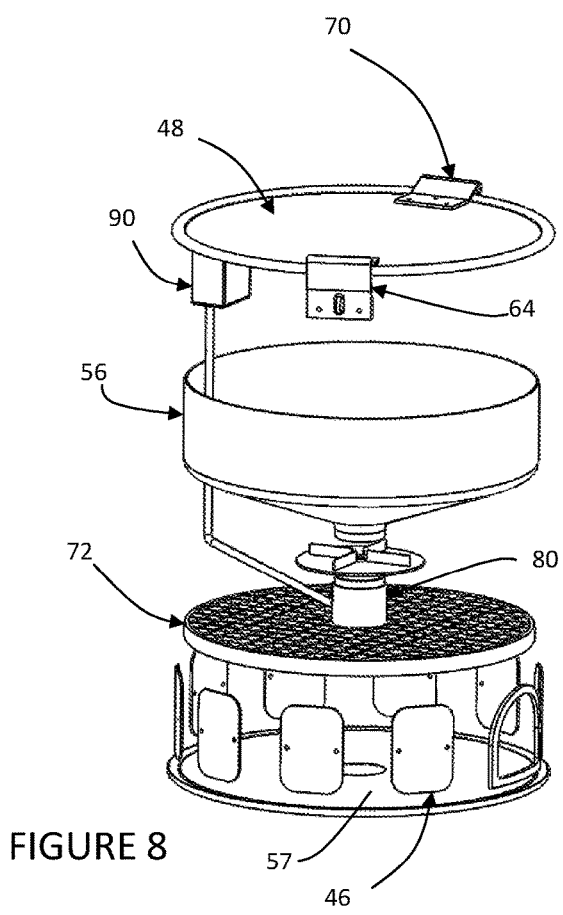
FIG. 8 is a perspective view of the feeder portion of the game feeding system of FIG. 1 with barrel portion and controller removed.

In another form, feeder portion 12 is utilized in a ground supported standard configuration for small-medium game such as turkeys. In this configuration, a feeder portion 12 with attached inferior barrel cover 50 of a game feeder portion 12 rests on the ground and game feed drops down through an inferior mouth 54 portion of a feed funnel 56 to a spinner plate 86. The game feed is spun off the spinner plate 86 with the help of fins 88, through grate 72 to the top face 57 of inferior barrel cover 50. Small game access holes 34 are uncovered by removal of one or more cover plates 46. Small game, such as turkeys, extend their heads through the small game access holes 34 to gather and consume the feed. In an alternative standing standard configuration for small-medium sized game (FIG. 6), the game feeder portion 12 is elevated by removable legs 55. Small game access holes 34 remain uncovered. Leg receivers 59 are secured to an outer surface of lower barrel ring 17 however in other embodiments the leg receiver may be welded, fastened, or otherwise fixed to outer face 28 of barrel portion 18. In this embodiment, leg receiver 59 comprises a fixture portion 61 configured for attachment to an outer surface of lower barrel ring 17 or outer face 28 of barrel portion 18. Leg receiver 59 also comprises a receiver portion 63 configured to receive and stabilize an end of removable leg 55. For example, receiver portion 63 may be in the form a leg recess 65 sized and shaped to receive an end of removable leg 55. Alternatively receiver portion 63 may be in the form of a post sized and shaped for sliding a tube end of a removable leg 55 over. Many other connection mechanisms may be used as available from the prior art. In an alternative embodiment, leg 55 may be hinged to leg receiver 59 wherein the legs are folded inwards in preparation for transport of feeder portion 12.

Figure 12:
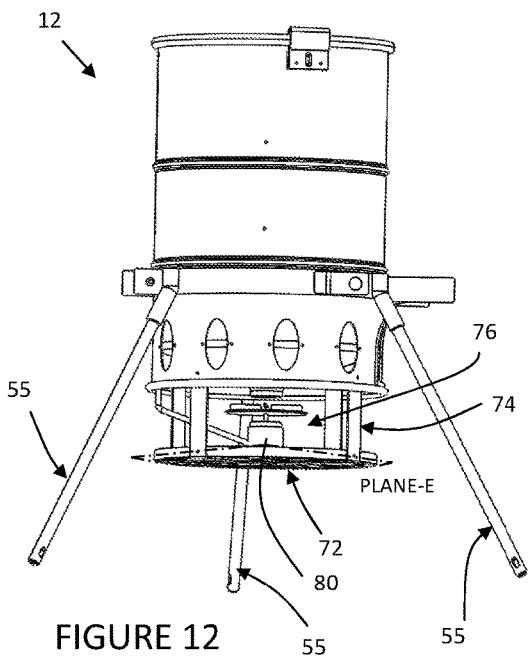
FIG. 12 is a perspective view of one embodiment of a feeder portion in an extended configuration elevated by legs.
Figure 13:
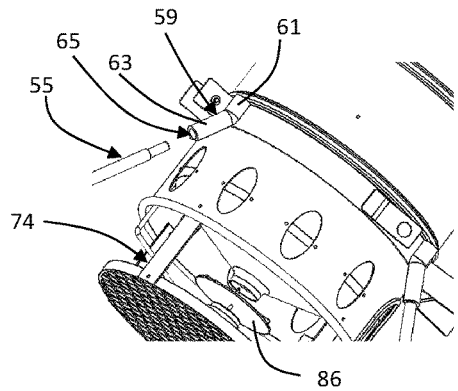
FIG. 13 is a partial perspective view of a feeder portion illustrating legs removed from a receiver portion of a leg receiver.
Figure 14:
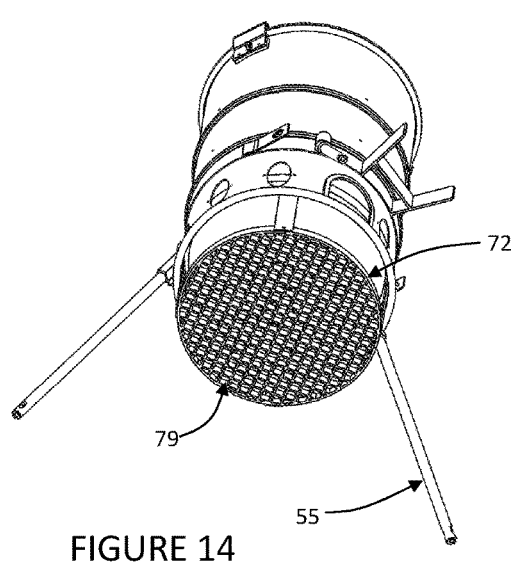
FIG. 14 is an inferior perspective view of the feeder portion of FIG. 12.

Another form of feeder portion 12 consists of a standing extended configuration for small-medium game such as turkey or deer (FIG. 12). Here, feeder portion 12 is in an extended configuration wherein grate portion 72 with motor housing 80, spinner plate motor 82 with spinner plate 86 is secured by extension straps 74 below an inferior rim 22 of a barrel 18. Feeder portion 12 is elevated by a plurality of removable legs 55. Game feed drops down through an inferior mouth 54 portion of a feed funnel 56 to a spinner plate 86. The game feed is spun off spinner plate 86 with the assistance of fin 88 and falls through the grate to the ground where a medium or small game such as deer or turkey can consume it. An inferior barrel cover 50 may be used.

In one form of an extended hanging configuration for all sized game, a barrel portion 18 is in an extended configuration wherein a grate portion 72 with motor housing 80, spinner plate motor 82 with spinner plate 86 is secured by extension straps 74 below an inferior rim 22 of a barrel 18 creating an extension space 76. The feeder portion 12 is hung by a tension line 35 (FIG. 16) extending from a fixed overhead structure such as a tree branch or a support line 43 extending between two spaced trees or other fixed objects. The tension line 35 may interface with a pulley and a winch to ease raising and lowering the feeder portion 12. Game feed drops down through an inferior mouth portion 54 of a feed funnel 56 to a spinner plate 86. The game feed is spun off spinner plate 86 and falls through an extension space then through the grate portion 72 to the ground where game such as a bear, turkey, or deer can consume it.

Users may change between the various configurations by simple disassembly of fasteners, repositioning of parts as described herein, and reapplication of fasteners.

The embodiment illustrated in FIG. 1 is effective for feeding bears and may be configured to function as an intermittent feeder. A prototype was constructed by the applicant and tested. Superior barrel cover 48 was opened exposing feed space 60 within barrel portion 18. The feed space 60 was filled with 150 pounds of shelled corn and superior barrel cover 48 was re-secured in a closed position. Control 96 was programmed to intermittently activate spinner plate motor 82 coupled to spinner plate 86 for eight seconds each day. Game feed dropping from the inferior mouth 54 was then spun off spinner plate 86 and dropped through grate 80 before landing on the top face 57 of inferior barrel cover 50. Bear regularly accessed the game feed using their paw by reaching through large game access hole 32. The preprogrammed intermittent distribution controlled by controller 96 provided an effective method for distributing game feed in smaller portions for a period of 6 weeks before the feed space emptied and required refilling. The user however, may adjust the controller as desired to control factors such as distribution frequency, distribution length, feed plate speed, and distribution times.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. An automated game feeding system for dispensing game feed over an extended period of time comprising:
   a barrel portion;
   said barrel portion comprising a barrel wall;
   said barrel wall comprising an inner face;
   a feed funnel;
   said feed funnel comprising a superior mouth portion diametrically sized to span the inside of said inner face of said barrel wall;
   said feed funnel comprising an inferior mouth portion having an open diameter smaller than said superior mouth portion;
   a sloped feed support wall of said feed funnel extending between said superior mouth portion and inferior mouth portion for biasing feed toward said inferior mouth portion;
   said feed support wall comprising an upper face;
   said feed funnel disposed within said inner face of said barrel portion;
   said barrel portion comprising a superior barrel cover;
   a feed space defined by said inner face of said barrel portion and an upper face of said feed support wall of said feed funnel and said superior barrel cover for storage of game feed therein;
   a spinner plate spaced below said inferior mouth portion;
   a spinner plate motor coupled to said spinner plate for imparting rotation on said spinner plate;
   a grate portion positioned below said spinner plate motor sufficient for restricting access by game to game feed stored in said feed space;
   said grate portion comprising a plurality of feed apertures to provide passage of game feed;
   a battery for providing electrical energy to said spinner plate motor;
   a control electrically coupled between said spinner plate motor and said battery for controlling on and off cycles of said spinner plate motor;
   and said spinner plate motor coupled to said grate portion.

2. The game feeding system of claim 1 further comprising one or more large game access holes extending through an inferior barrel wall sized to provide access by a bear's paw to feed fallen through said feed apertures.

3. The game feeding system of claim 2 further comprising one or more small game access holes extending through an inferior barrel wall sized for access by a turkey's beak.

4. The game feeding system of claim 1 further comprising a plurality of removable legs for holding said barrel portion off a ground surface.

5. The game feeding system of claim 1 further comprising a hanger portion extending from said barrel portion for securing said game feeding system from a fixed overhead object.

6. The game feeding system of claim 1 further comprising a barrel trailer wherein said barrel trailer comprises a transport beam for supporting said game feeding system during transport.

7. The game feeding system of claim 1 further comprising an anchor portion for abutting said barrel portion against an immovable object such as a tree trunk.

8. The game feeding system of claim 7 wherein said anchor portion cooperates with one or more fixation straps coupled with said barrel portion for securing said barrel portion to an immovable object such as a tree trunk.

9. The game feeding system of claim 1 further comprising one or more extension straps extending between said grate portion and said barrel portion for spacing said grate below an inferior rim of said barrel portion.

10. The game feeding system of claim 1 wherein said superior barrel cover is locked to said barrel portion for restricting entry into said feed space by bears.

11. An automated game feeding system convertible between a ground supported configuration and a standing configuration and a bear-safe hanging configuration comprising:
    a barrel portion;
    said barrel portion comprising a barrel wall;
    said barrel portion comprising an inferior rim at an inferior end of said barrel wall;
    said barrel wall comprising an inner face;
    a feed funnel;
    said feed funnel comprising a superior mouth portion diametrically sized to span the inside of said inner face of said barrel wall;

said feed funnel comprising an inferior mouth portion having an open diameter smaller than said superior mouth portion;

a sloped feed support wall of said feed funnel extending between said superior mouth portion and inferior mouth portion for biasing feed toward said inferior mouth portion;

a spinner plate spaced below said inferior mouth portion;

a spinner plate motor coupled to said spinner plate for imparting rotation on said spinner plate for the spreading of game feed;

a grate portion positioned below said spinner plate motor sufficient for restricting access by game from game feed stored in said feed space;

one or more leg receivers coupled to said barrel portion;

one or more removable legs;

said removable legs receivable in said leg receivers to support said removable legs;

and a hanger portion extending from said barrel portion for suspending said barrel portion from a fixed overhead object.

12. The game feeding system of claim 11 wherein in a ground supported configuration said barrel portion is supported by the ground and said grate is positioned superior to one or more large game access holes.

13. The game feeding system of claim 12 further comprising an anchor portion having a pair of spaced anchor arms coupled to said barrel portion for anchoring said barrel portion to an immovable object such as a tree trunk.

14. The game feeding system of claim 11 wherein in a standing configuration said barrel portion is supported by said removable legs extending between said leg receivers and a ground surface and wherein said grate is positioned inferior to said inferior rim of said barrel portion.

15. The game feeding system of claim 14 further comprising extension straps extending between an inferior barrel portion and said grate.

16. The game feeding system of claim 11 wherein in a bear-safe hanging configuration said barrel portion is supported by said hanger portion from a tension line and wherein said grate is positioned inferior to said inferior rim.

17. The game feeding system of claim 16 wherein said spinner plate spreads game feed through an extension space between said grate and said barrel portion.

18. The game feeding system of claim 11 wherein in said standing configuration and said bear-safe hanging configuration game feed is spread radially beyond the diameter of said barrel portion and falls through feed apertures of said grate portion.

19. The game feeding system of claim 11 further comprising small game access holes disposed in an inferior portion of said barrel wall.

20. The game feeding system of claim 19 further comprising removable cover plates configured for blocking said small game access holes.

* * * * *